G. CROMPTON.

Harness-Motion for Looms.

No. 6,442.

Reissued May 25, 1875.

Witnesses.

L. H. Latimer.

Wm. Pratt.

Inventor.

George Crompton

PER Crosby & Gregory ATTYS.

THE GRAPHIC CO. PHOTO-LITH. 39 & 41 PARK PLACE, N.Y.

UNITED STATES PATENT OFFICE.

GEORGE CROMPTON, OF WORCESTER, MASSACHUSETTS.

IMPROVEMENT IN HARNESS-MOTIONS FOR LOOMS.

Specification forming part of Letters Patent No. 59,972, dated November 27, 1866; reissue No. 6,442, dated May 25, 1875; application filed May 15, 1875.

*To all whom it may concern:*

Be it known that I, GEORGE CROMPTON, of Worcester, in the county of Worcester and State of Massachusetts, have invented certain new and useful Improvements in Harness-Motion for Looms; and I do hereby declare that the following, taken in connection with the drawings which accompany and form part of this specification, is a description of my invention sufficient to enable those skilled in the art to practice it.

This invention relates to the harness-operating mechanism of fancy and narrow-ware looms; and consists in mounting the sheaves over which run the cords attached to and operating the heddle or harness frames so that the harness-frames may be simultaneously raised or lowered to keep the plane of the warp in proper position with relation to the race of the lay; also, in the combination, with elevators and depressors, of jacks, elbow-levers, sheaves, cords, or connections for the harness-frames, the jacks being connected with the elbow-levers, and the levers by cords or connections with the harness-frames, and the cords are passed over sheaves between the levers and frames.

Figure 1:
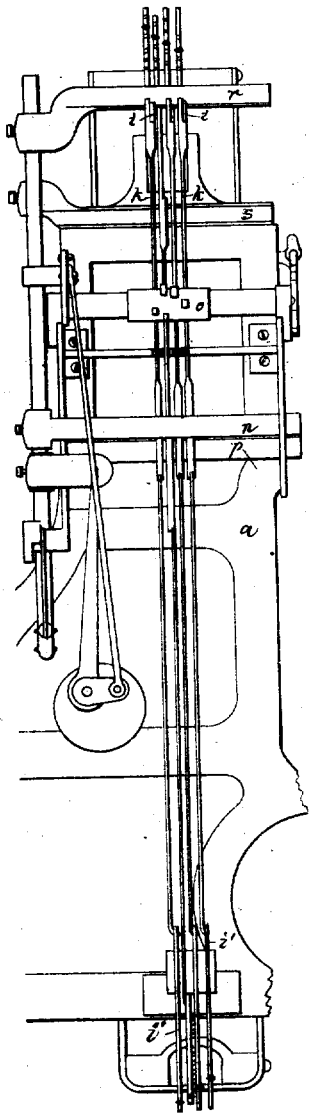
Figure 2:
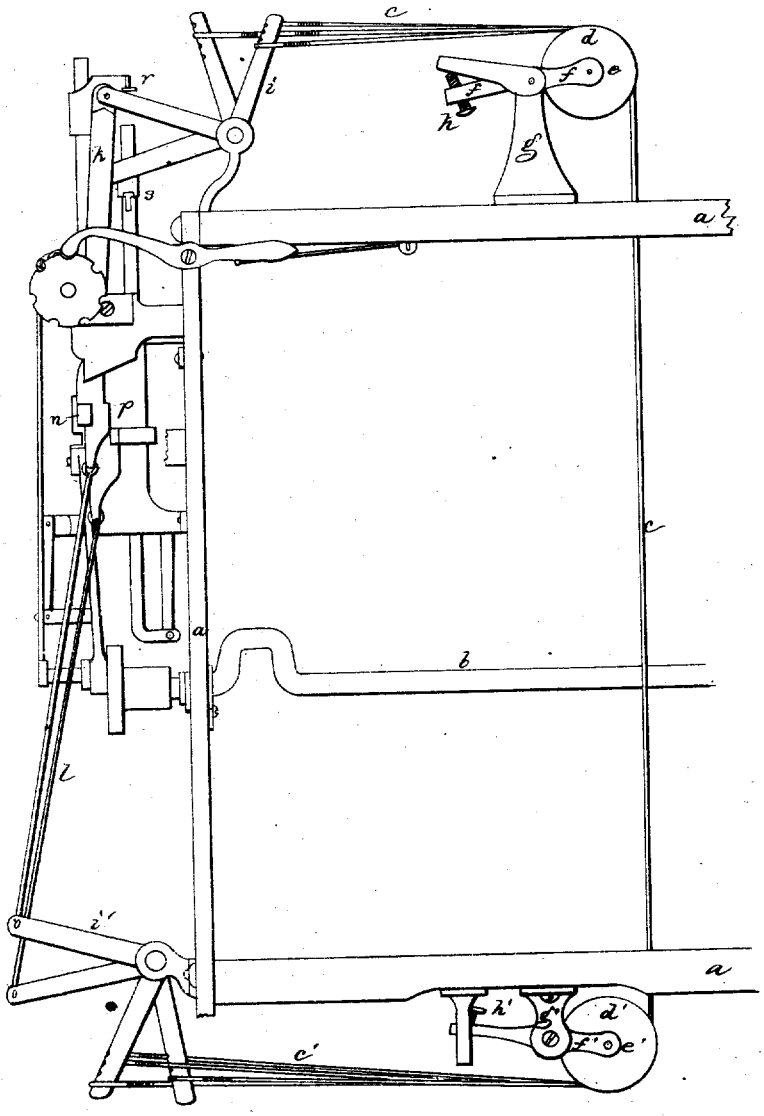
Figure 3:
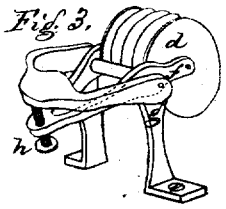

Figure 1 represents an end view of a loom provided with my improvement; Fig. 2, a side view; and Fig. 3, the sheave supporting and adjusting mechanism detached.

In the drawing, *a* denotes the frame; *b*, the driving-shaft; *c*, the heddle wires or cords to which the harness-frames are connected, running over sheaves or pulleys *d d'* above and beneath the frame *a*, the heddle-frames being suspended by these wires between the sheaves in the ordinary manner. The upper sheaves *d* are placed upon a shaft, *e*, having its bearings in a swinging frame, *f*, which turns on a shaft mounted in bearings on a standard, *g*. The frame *f* has an adjusting-screw, *h*, which abuts against an extension of the standard *g*, and by means of this screw the frame, and with it the whole series of sheaves, and with them all the heddles or harness-frames, are simultaneously and equally raised and lowered. The lower sheaves *d'* are similarly arranged with respect to a shaft, *e'*, frame *f'*, standard *g'*, and adjusting-screw *h'*, so that the frames may be adjusted in position, and this stress upon the frames be uniformly maintained, and increased or decreased at pleasure. The heddle-wires of each harness-frame are attached to the upper and lower ends, respectively, of bent or elbow levers *i i'*, which constitute the heddle-levers, and which are jointed together at their outer ends, each one of the upper set to the opposite one of the lower set by jacks *k* and connecting-rods *l*, each jack *k* having a hook, both upon its front and rear edge. Normally the jacks are held in such position by the strain of the rods *l* as to keep the hooks in line with the lifter-bar *n*, while by the action of the projections on the pattern-cylinder *o* part of the jacks are intermittently, or previous to each shed, thrown out of the path of movement of this lifter, and into such position that their rear hooks are in the path of movement of a depressor-bar, *p*.

The manner of operating the jacks, the pattern-cylinder, and eveners *r s*, and of successively producing and changing the shed, is well known, and will be obvious from the drawings without further description.

To produce an even and uniform opening of the shed through all the harnesses, it is customary to operate the lifter and depressor bars into inclined positions, or to make their acting faces inclined, so that the harnesses most remote from the shuttle-race may be raised or lowered to such extent as to bring them into the plane of the nearer ones, and make all the threads in each plane coincident in that portion of the shed through which the shuttle passes, and with some other looms differently constructed, as with long upright heddle-levers, this evening of the shed is accomplished with a graduated attachment of the heddle-wires in a series of notches on the long heddle-levers; but this last arrangement is objectionable, because the long levers are unwieldy, hard to make, and easily broken. I accomplish this object, in a loom having the general arrangement of mechanism here shown, by making the acting face or edge of each lifter and depressor bar horizontal, and by constructing each angular heddle-lever with a series of notches for attachment of the heddle-wires, so that each harness-frame may be so adjusted by the notches as to produce the desired uniformity in the shed, while at each new disposition of the jacks by the pattern-cylinder their hooks are simultaneously acted upon and engaged by the lifter or depressor bar according to the position of the jacks in the paths of these bars.

I do not claim, broadly, a provision for adjustment of the harness-frames by raising and lowering the upper sheaves, over which the heddle wires or cords pass, as I am aware that that has been done by simply adjusting one set of sheaves and not the other; the harness-frame-supporting cords are simply tightened; but it is often necessary to adjust the position of the harness-frames by raising or lowering them, so as to bring them into such a position with reference to the lay-race that the warps of the lower half of the shed, when open, will just reach to the top of the race of the lay. This adjustment is necessary with change of harness-frames, and when a large or small number of harness-frames are used the lay is often adjusted high or low to correspond with the depth of the shed then being made.

By having these adjustable sheaves at bottom and top it will be evident that the tightness of the cords *c* can be controlled, and also that the position of the frames may be varied to control the lowermost position of the warp during shedding.

Having described my invention, I claim—

1. The combination, with the frame of the loom, and with cords for moving the harness-frames, of adjustable sheaves at the bottom and at the top of the loom, over which the cords pass, to permit the adjustment of the harness-frames and cording, substantially as described.

2. In combination, the sheaves, the pivoted frame, and mechanism for adjusting the position of the sheaves and frames, substantially as described.

3. In combination, a lifter and depressor, jacks, and elbow or angular levers connected with the jacks, and notched for adjustment of the harness or heddle cords, the latter extending from the elbow or angular levers to the harness-frames, substantially as described.

GEO. CROMPTON.

Witnesses:
G. W. GREGORY,
WM. PRATT.